(12) United States Patent
Nakamura et al.

(10) Patent No.: US 9,972,113 B2
(45) Date of Patent: May 15, 2018

(54) COMPUTER-READABLE RECORDING MEDIUM HAVING STORED THEREIN ALBUM PRODUCING PROGRAM, ALBUM PRODUCING METHOD, AND ALBUM PRODUCING DEVICE FOR GENERATING AN ALBUM USING CAPTURED IMAGES

(71) Applicant: FUJITSU LIMITED, Kawasaki-shi, Kanagawa (JP)

(72) Inventors: Yasufumi Nakamura, Kawasaki (JP); Aki Kita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/206,022

(22) Filed: Jul. 8, 2016

(65) Prior Publication Data

US 2016/0321831 A1 Nov. 3, 2016

Related U.S. Application Data

(63) Continuation of application No. PCT/JP2014/050606, filed on Jan. 15, 2014.

(51) Int. Cl.
*G06K 9/46* (2006.01)
*G06T 11/60* (2006.01)
(Continued)

(52) U.S. Cl.
CPC .......... *G06T 11/60* (2013.01); *G06F 17/3028* (2013.01); *G06K 9/00228* (2013.01);
(Continued)

(58) Field of Classification Search
CPC .. G06T 11/60; G06K 9/6267; G06K 9/00228; G06K 9/46; G06K 9/00718;
(Continued)

(56) References Cited

U.S. PATENT DOCUMENTS

2004/0208365 A1\* 10/2004 Loui ................... G06F 17/3025
382/171
2008/0089590 A1 4/2008 Isomura et al.
(Continued)

FOREIGN PATENT DOCUMENTS

JP 2006-295890 10/2006
JP 2007-249434 9/2007
(Continued)

OTHER PUBLICATIONS

International Search Report of PCT/JP2014/050606, dated Feb. 18, 2014.

*Primary Examiner* — Amir Alavi
(74) *Attorney, Agent, or Firm* — Maschoff Brennan

(57) ABSTRACT

An image processing device classifies captured images into event images captured in each event duration corresponding to a predetermined event or usual-day images captured out of the event duration. The image processing device produces, for each duration, an event page in which event images of an event in the duration are inserted and a usual page in which usual-day images in the duration are inserted. The image processing device generates an album using the event page and the usual page produced for the duration.

6 Claims, 20 Drawing Sheets

(51) Int. Cl.
 *G06F 17/30* (2006.01)
 *G06K 9/00* (2006.01)
 *G06K 9/62* (2006.01)

(52) U.S. Cl.
 CPC .............. *G06K 9/46* (2013.01); *G06K 9/6267* (2013.01); *G06K 2009/4666* (2013.01)

(58) Field of Classification Search
 CPC ........ G06K 9/00797; G06K 2209/4666; G06F 17/3028; G06F 17/30257; G06F 17/3024; H04N 1/40062
 See application file for complete search history.

(56) References Cited

U.S. PATENT DOCUMENTS

| | | | |
|---|---|---|---|
| 2008/0298643 A1* | 12/2008 | Lawther | G06F 17/30256 382/118 |
| 2009/0034805 A1* | 2/2009 | Perlmutter | G06F 17/30256 382/118 |
| 2009/0161962 A1* | 6/2009 | Gallagher | G06F 17/30247 382/203 |
| 2009/0257663 A1* | 10/2009 | Luo | G06F 17/30265 382/224 |
| 2010/0253807 A1 | 10/2010 | Matsumoto et al. | |
| 2011/0044530 A1* | 2/2011 | Wang | G06K 9/00664 382/154 |
| 2012/0027293 A1* | 2/2012 | Cok | G06F 17/30056 382/164 |
| 2014/0056541 A1 | 2/2014 | Inoue et al. | |
| 2016/0321831 A1* | 11/2016 | Nakamura | G06T 11/60 |

FOREIGN PATENT DOCUMENTS

| | | |
|---|---|---|
| JP | 2010-259064 | 11/2010 |
| WO | 2013/088696 | 6/2013 |

* cited by examiner

FIG.1
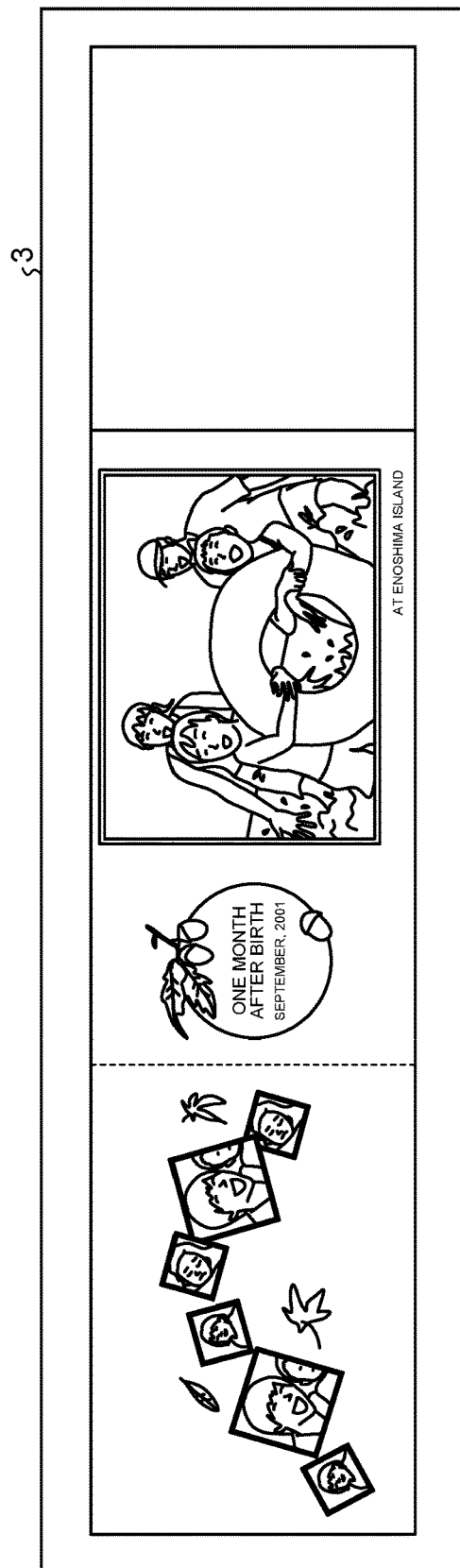
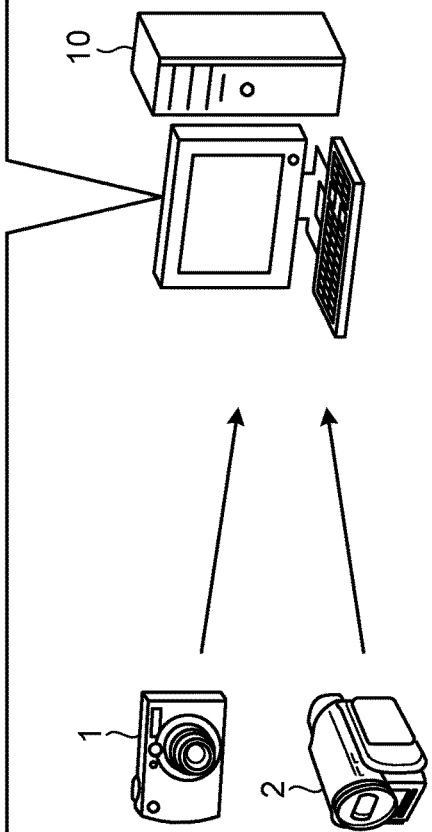

FIG.3

| IMAGE Index | FILE NAME | STORAGE PATH | IMAGE TYPE | IMAGE CAPTURING DATE | IMAGE CAPTURING PLACE |
|---|---|---|---|---|---|
| 1 | Photo000.jpg | C:¥20100331 | P | 2010/3/31 10:00:24 | LATITUDE 43°34' NORTH LONGITUDE 133° EAST |
| 2 | Photo001.jpg | C:¥20100331 | P | 2010/3/31 12:10:02 | LATITUDE 43°34' NORTH LONGITUDE 133° EAST |
| 3 | Photo002.jpg | C:¥20100331 | P | 2010/3/31 15:30:41 | LATITUDE 43°34' NORTH LONGITUDE 133° EAST |
| ... | ... | ... | ... | ... | ... |
| 3001 | Movie001.mpg | C:¥20100331 | M | 2010/3/31 9:55:14 | |
| 3002 | Movie002.mpg | C:¥20100331 | M | 2010/3/31 11:10:22 | |
| 3003 | Movie003.mpg | C:¥20100331 | M | 2010/3/31 14:30:01 | |
| | ... | ... | ... | ... | ... |

FIG.4

| ID | NAME | SEX | RELATION | DATA OF BIRTH |
|---|---|---|---|---|
| 1 | TADASHI | MALE | PERSON OF INTEREST | AUGUST 28, 1968 |
| 2 | YUUKO | FEMALE | FAMILY: WIFE | OCTOBER 20, 1968 |
| 3 | TARO | MALE | FAMILY: CHILD | JULY 12, 2001 |
| 4 | HANAKO | FEMALE | FAMILY: CHILD | OCTOBER 4, 2003 |
| 11 | BOY A | | FRIEND | |
| 12 | BOY B | | FRIEND | |
| 13 | GIRL C | FEMALE | FRIEND | |
| ... | ... | ... | ... | ... |

FIG.5

| Index | IMAGE ID | OBJECT ID | OBJECT REGION |
|---|---|---|---|
| ... | ... | ... | ... |
| 223 | 1201 | 1 | (13, 0)-(157, 220) |
| 224 | 1201 | 2 | (311, 38)-(147, 194) |
| 225 | 1201 | 4 | (181, 12)-(108, 147) |
| ... | ... | ... | ... |

FIG.7

| EVENT NAME | DURATION | PRIORITY |
|---|---|---|
| BIRTHDAY | 10/4 | 1 |
| NEW YEAR | 1/1 TO 1/7 | 2 |
| CLOSE OF WINTER | 2/3 | 2 |
| DOLL FESTIVAL | 3/3 | 2 |
| GW | 4/29 TO 5/5 | 2 |
| TANABATA | 7/7 | 2 |
| BON HOLIDAY | 8/13 TO 8/16 | 2 |
| HALLOWEEN | 10/25 TO 10/31 | 2 |
| CHRISTMAS | 12/24 TO 12/25 | 2 |
| NEW YEAR'S EVE | 12/31 | 2 |

FIG.8

| TARGET PAGE | IMAGE CAPTURING DATE | NUMBER OF CAPTURED IMAGES | EVENT NAME |
|---|---|---|---|
| APRIL | 4/29 | 18 | GW |
| MAY | 5/3 | 15 | GW |
| JUNE | 0 | 0 | NULL |
| JULY | 7/7 | 11 | TANABATA |
| AUGUST | 8/13, 8/14, 8/15 | 12, 16, 15 | BON HOLIDAY |
| SEPTEMBER | 9/23 | 12 | NUMBER OF IMAGES |
| OCTOBER | 10/14 | 17 | BIRTHDAY |
| NOVEMBER | 11/11 | 12 | NUMBER OF IMAGES |
| DECEMBER | 12/24 | 14 | CHRISTMAS |
| JANUARY | 1/1, 1/4 | 14, 23 | NEW YEAR |
| FEBRUARY | 2/3 | 11 | CLOSE OF WINTER |
| MARCH | 3/3 | 8 | DOLL FESTIVAL |

FIG.9

| TARGET PAGE | IMAGE CAPTURING DATE | NUMBER OF CAPTURED IMAGES |
|---|---|---|
| APRIL | 4/7 | 4 |
| MAY | 5/10, 5/22 | 12, 3 |
| JUNE | 6/4 | 2 |
| JULY | 7/12, 7/23, 7/31 | 4, 12, 20 |
| AUGUST | 8/28 | 3 |
| SEPTEMBER | 9/12 | 2 |
| OCTOBER | 10/12, 10/18, 10/31 | 2, 3, 11 |
| NOVEMBER | 11/23 | 5 |
| DECEMBER | 12/10, 12/23 | 4, 12 |
| JANUARY | 1/15 | 3 |
| FEBRUARY | 2/16, 2/23 | 2, 3 |
| MARCH | 3/18 | 4 |

FIG.10

```xml
<?xml version="1.0" encoding="utf-8"?>
<GrowthAlbum>
<VolumeType>Year</VolumeType>
<StartMonth>4</StartMonth>
<PageOfDuration>Month</PageOfDuration>
<FrontPage></FrontPage>
<BodyPage>
  <EventPage>
    <PageNum>1</PageNum>
    <Area>
      <FaceThumbnail>5</FaceThumbnail>
      <LargeFace>1</LargeFace>
      <SmallFace>1</SmallFace>
      <Relation>
        <RelationType>Family</RelationType>
        <RelationFace>1</RelationFace>
      </Relation>
    </Area>
  </EventPage>
  <UsualPage>
    <PageNum>1</PageNum>
    <Area>
      <FaceThumbnail>5</FaceThumbnail>
      <LargeFace>1</LargeFace>
      <SmallFace>1</SmallFace>
      <Relation>
        <RelationType>Family</RelationType>
        <RelationFace>1</RelationFace>
      </Relation>
    </Area>
  </UsualPage>
</BodyPage>
<EndingPage></EndingPage>
</GrowthAlbum>
```

| DISPLAY ORDER | PAGE CONTENT |
|---|---|
| 1 | FRONT PAGE |
| 2 | APRIL USUAL DAY |
| 3 | APRIL EVENT |
| 4 | MAY USUAL DAY |
| 5 | MAY EVENT |
| ... | ... |
| 24 | MARCH USUAL DAY |
| 25 | MARCH EVENT |
| 26 | ENDING |

| PLACE | POSITION | SIZE |
|---|---|---|
| FACE THUMBNAIL AREA | 100, 100 | 200, 200 |
| FACE THUMBNAIL AREA | 200, 200 | 200, 200 |
| FACE THUMBNAIL AREA | 300, 300 | 200, 200 |
| FACE THUMBNAIL AREA | 400, 200 | 200, 200 |
| FACE THUMBNAIL AREA | 500, 100 | 200, 200 |
| LARGE FACE AREA | 1000, 800 | 1200, 1200 |
| SMALL FACE AREA | 2000, 800 | 1200, 1200 |
| FAMILY PICTURE AREA | 1500, 400 | 1200, 1200 | ics
COMPUTER-READABLE RECORDING MEDIUM HAVING STORED THEREIN ALBUM PRODUCING PROGRAM, ALBUM PRODUCING METHOD, AND ALBUM PRODUCING DEVICE FOR GENERATING AN ALBUM USING CAPTURED IMAGES

CROSS-REFERENCE TO RELATED APPLICATION

This application is a continuation of International Application No. PCT/JP2014/050606, filed on Jan. 15, 2014 and designating the U.S., the entire contents of which are incorporated herein by reference.

FIELD

The embodiments discussed herein are related to a non-transitory computer-readable recording medium having stored therein an album producing program, an album producing method, an album producing device.

BACKGROUND

As digital cameras and video cameras become widely available, more and more pictures and videos are captured at home. Typical individually owned mobile phones and smartphones have an image capturing function, which leads to an increase in opportunities to store pictures and moving images of usual-day events.

A large number of digital cameras and smartphones have a face recognition technology that recognizes a person photographed in an image. Typical personal computers have a function to collectively manage stored image data for each photographed object.

For example, a user uses these functions to pick up a picture in which, for example, the face of a child is nicely photographed, from among pictures in each of which an image of the child is recognized, and produce an album as a growth record. In this case, the user needs to select a desired picture from among a huge number of pictures, which puts a large work load on the user.

A recent known technique produces an album with a simple operation by classifying a picture in which a person is photographed into an event based on its image capturing date and image capturing place, and displaying pictures of the classified event together with an image being displayed. Another known technique produces an album by acquiring images from an image database and arranging them in a selected album template. Still another known technique automatically generates an album by classifying each picture into an event based on, for example, its image capturing time and image capturing place, and allocating the classified event picture to each page. Conventional technologies are described in Japanese Laid-open Patent Publication No. 2010-259064, Japanese Laid-open Patent Publication No. 2007-249434, and Japanese Laid-open Patent Publication No. 2006-295890, for example.

However, the above-described techniques produce an album using pictures related to events, and thus the album includes a small number of pictures captured on usual days other than the events.

For example, when an album is produced as a growth record of a child, such an album includes a large number of pictures captured at events such as his or her birthday, New Year, the close of winter, and Christmas, but includes no pictures captured on usual days at a park and an amusement park. The album produced in this manner is not a growth record of the child but is merely an event record. As described above, the above-described techniques produce an album biased toward events and thus having a large information bias.

SUMMARY

According to an aspect of the embodiment, a non-transitory computer-readable recording medium stores therein an album producing program that causes a computer to execute a process. The process includes classifying captured images into event images captured in event duration corresponding to a predetermined event or usual-day images captured out of the event duration; producing, for each duration, an event page in which event images of an event in the duration are inserted and a usual page in which usual-day images in the duration are inserted; and generating an album using the event page and the usual page produced for the duration.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating an image processing device according to a first embodiment;

FIG. 3 is a diagram illustrating exemplary information stored in an image DB;

FIG. 4 is a diagram illustrating exemplary information stored in an object DB;

FIG. 5 is a diagram illustrating exemplary information stored in an object information DB;

FIG. 7 is a diagram illustrating exemplary information stored in an event list DB;

FIG. 8 is a diagram illustrating exemplary information stored in an event DB;

FIG. 9 is a diagram illustrating exemplary information stored in a usual-day DB;

FIG. 10 is a diagram illustrating an exemplary pickup rule stored in a template DB;

DESCRIPTION OF EMBODIMENTS

Preferred embodiments will be explained with reference to accompanying drawings. The present invention is not limited by the embodiments.

[a] First Embodiment

Overall Configuration

FIG. 1 is a diagram illustrating an image processing device according to a first embodiment. This image processing device 10 illustrated in FIG. 1 is a device such as a personal computer or a server that reads images captured by a digital camera 1, a video camera 2, another device to produce an album 3, and is an exemplary album producing device. The image processing device 10 may also read images from, for example, a smartphone. Images used in the present embodiment include a still image, a moving image, and a video.

The image processing device 10 includes an image processing application installed thereon. The image processing application reads an image from, for example, an external device or a recording medium, and executes typical processing such as face recognition on the read image to execute a function to manage the image.

The image processing device 10 classifies captured images into event images captured in each event duration corresponding to a predetermined event and usual-day images captured out of the event duration. Subsequently, the image processing device 10 produces, for each duration, an event page including event images of an event in this duration and a usual page including usual-day images in this duration. Then, the image processing device 10 generates an album using the event page and the usual page produced for the duration.

For example, the image processing device 10 can classify captured pictures as event pictures or usual-day pictures according to months and days prepared in advance for specifying events, and generate an event picture page and a usual-day picture page for each month. Accordingly, the image processing device 10 can produce an album using event and usual-day images and produce a less biased album.

Functional Configuration

Figure 2:
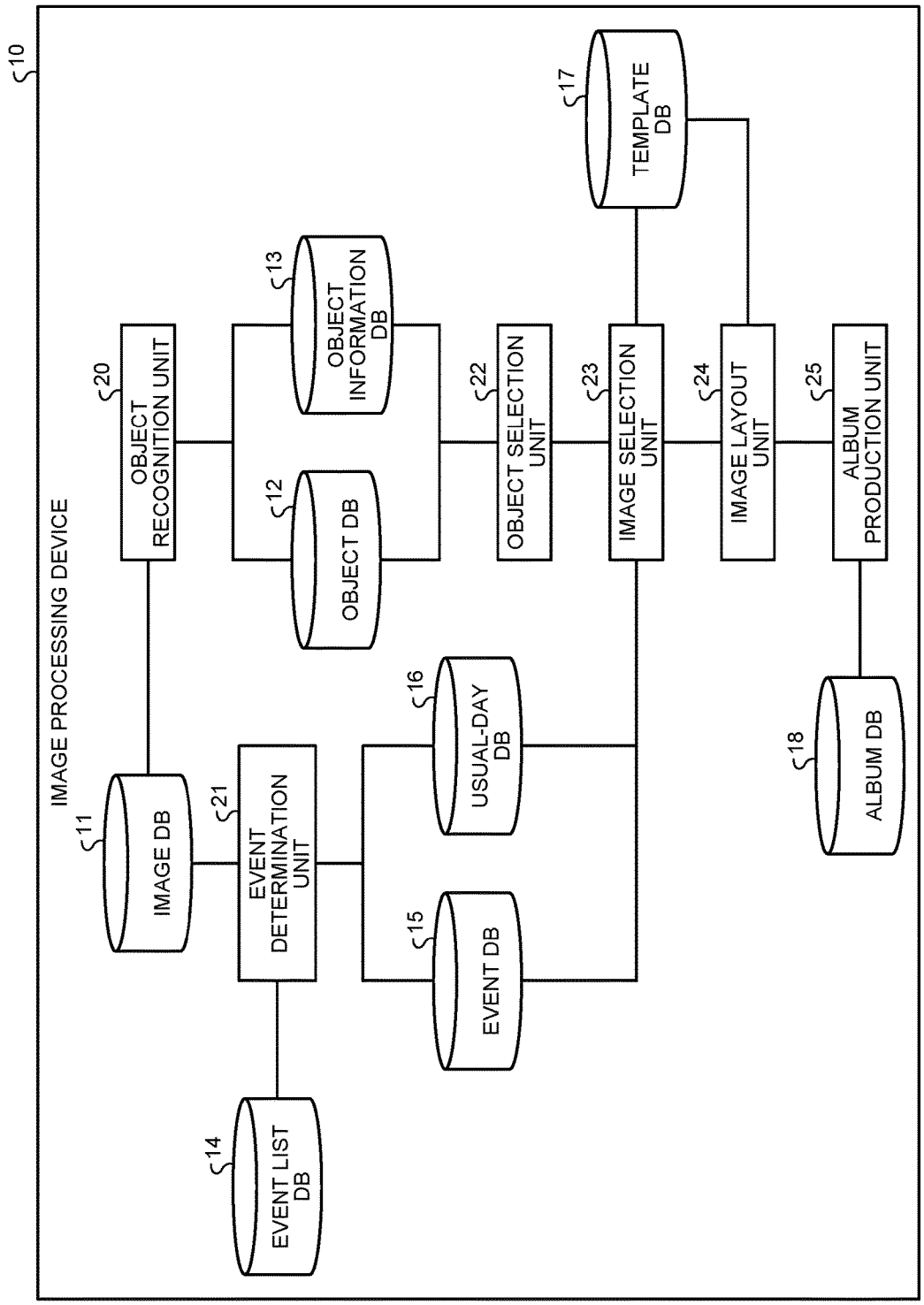
FIG. 2 is a functional block diagram of a functional configuration of the image processing device according to the first embodiment.

FIG. 2 is a functional block diagram of a functional configuration of the image processing device according to the first embodiment. As illustrated in FIG. 2, the image processing device 10 has an image database (DB) 11, an object DB 12, an object information DB 13, an event list DB 14, an event DB 15, a usual-day DB 16, a template DB 17, and an album DB 18. The image processing device 10 includes an object recognition unit 20, an event determination unit 21, an object selection unit 22, an image selection unit 23, an image layout unit 24, and an album production unit 25.

Each DB is a database stored in a storage device such as a memory or a hard disk. Each processing unit is an exemplary electronic circuit included in a processor or an exemplary process executed by the processor.

The image DB 11 stores therein images read from, for example, an external device and a recording medium. FIG. 3 is a diagram illustrating exemplary information stored in the image DB. As illustrated in FIG. 3, the image DB 11 stores therein "Image index, File name, Storage path, Image type, Image capturing date, Image capturing place" in association with one another.

Among the stored data, "Image index" is a unique identifier for identifying an image, and may be an identifier automatically allocated by the image processing application or an image capturing device, for example. "File name" is the name of a file of the image, and may be a file name automatically set by the image processing application or the image capturing device, for example. "Storage path" is information indicating the path of a folder storing therein the file on the image processing device 10.

"Image type" is information indicating the type of the image. "P" is set to a still image such as a picture, and "M" is set to a moving image. "Image capturing date" is information indicating a date when the image was captured, and may be Exif information or a time stamp automatically set by the image capturing device. "Image capturing place" is information on the latitude and longitude of a place where the image was captured, and may be information automatically set by the image capturing device or information added by using the Global Positioning System (GPS) or other systems.

The image index "1" in FIG. 3 is described as an example. This image is a "still image" stored at "C:\20100331" with a file name of "Photo000.jpg". This image is captured at "latitude of 43° 34' north, and longitude of 133° east" at "10:00:24 on Mar. 31, 2010".

The object DB 12 is a database generated based on information on an object recognized by a face recognition technology such as the image processing application. FIG. 4 is a diagram illustrating exemplary information stored in the object DB. As illustrated in FIG. 4, the object DB 12 stores therein "ID, Name, Sex, Relation, Date of birth" in association with one another.

Among the stored data, "ID" is a unique identifier for uniquely specifying an object, and can be automatically set by an image processing program, for example. "Name" is the name of the object expressed in a text readable by a user, and is input by the user. "Sex" is a sex expressed in text understandable by the user, and may be input by the user or may be left blank.

"Relation" is a value indicating a relation between objects, and is set by the user. Because the relation exists between two objects, for convenience, the user of a system is set as "Person of interest", and relations of other persons with the system user are input. For the relation "Family", wife, husband, and child can be specified as sub-classifications. Alternatively, this field may be left blank. "Date of birth" is the date of birth of an object, and is a value set by the user.

When the face recognition technology such as the image processing application is used to group faces based on a similarity between them, typically, a face of a person may be classified into a wrong group in some cases. Moreover, faces in a group may include a face of a wrong person. To deal with these cases, a typical image management application based on the face recognition technology allows integration of faces of a person and exclusion of faces of a wrong person. When faces of a person are integrated, personal information such as a name is typically added to data of the person to facilitate management of the faces. In the following, results of organization of faces of a person and addition of the personal information by such an image processing application are used.

The object information DB 13 is a database generated by the image processing application or the like to manage which object in the object DB is photographed in each image stored in the image DB 11. FIG. 5 is a diagram illustrating exemplary information stored in the object information DB. As illustrated in FIG. 5, the object information DB 13 stores therein "Index, Image ID, Object ID, Object region" in association with one another.

Among the stored data, "index" is a unique identifier for uniquely specifying data. "Image ID" is image index information for managing an image stored in the image DB 11. "Object ID" is an ID for specifying an object managed in the object DB 12. "Object region" indicates a region in which the face of an object in an image is photographed, and region information determined at face recognition is used to specify a face region. In this example, a face region is specified by "(upper-left coordinates)–(lower-right coordinates)". Other methods of specifying a region may be employed. For example, a region may be specified as "(upper-left coordinates)–vertical size×horizontal size" by another specifying method.

Figure 6:
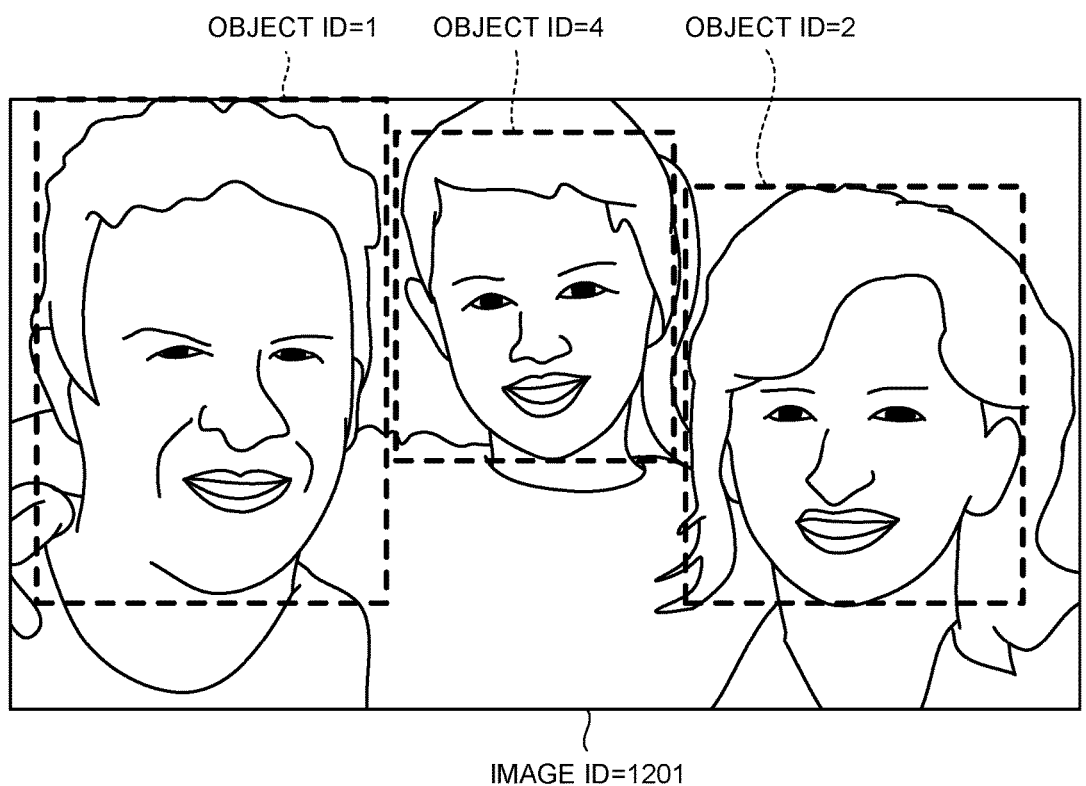
FIG. 6 is a diagram illustrating object information.

The following describes exemplary management of objects with reference to FIGS. 5 and 6. FIG. 6 is a diagram illustrating object information. As illustrated in FIG. 6, a picture with an image ID of 1201 presents, as objects, three persons of Tadashi with an object ID of 1, Yuuko with an object ID of 2, and Hanako with an object ID of 4. A face region of each object is illustrated with a dotted frame.

Three records of Index=223, 224, and 225 correspond to the picture with an image ID of 1201. The record of Index=223 indicates that the picture with an image ID of 1201 includes the face of an object with an object ID of 1 in a region of "(13, 0)–(157, 220)". Similarly, the record of Index=224 indicates that the picture with an image ID of 1201 includes the face of an object with an object ID of 2 in a region of "(311, 38)–(147, 194)". The record of Index=225 indicates that the picture with an image ID of 1201 includes the face of an object with an object ID of 4 in a region of "(181, 12)–(108, 147)".

The event list DB 14 is a database storing therein a predetermined event duration corresponding to each event. FIG. 7 is a diagram illustrating exemplary information stored in the event list DB. As illustrated in FIG. 7, the event list DB 14 stores therein "Event name, Duration, Priority" in association with one another.

Among the stored data, "Event name" is the name of an event, which is used as a comment in an album. "Duration" defines the duration of the event, and an image captured in the duration is determined as an event image. "Priority" indicates a priority among events. A smaller value indicates a higher priority. In this example, the event of a birthday has the highest priority, and other events have lower priorities.

Typically, one fixed event per month at maximum is registered in an event list, but a birthday differs between target objects and is an important event in terms of a growth record of an object. Thus, in the example of FIG. 7, the birthday has the highest priority and is selected as an event even when other events exist in the same month.

In the example of FIG. 7, an image captured between January 1 and January 7 is classified as an image of the event "New year", and an image captured on July 7 is classified as an image of the event "Tanabata".

Information stored in the event list DB 14 can be optionally set and changed by the user. For example, events such as a sports festival and a school play may be added. The image processing device 10 can update information stored in the event list DB 14 every year by synchronizing the event list DB 14 and a calendar.

The event DB 15 is a database storing therein information on an image classified into an event. FIG. 8 is a diagram illustrating exemplary information stored in the event DB. In this example, images are classified for each month of a particular year. The example of FIG. 8 lists image capturing dates in one year, information on the number of captured images, information in the event list DB 14, and a processing result with an "event minimum number" of ten.

As illustrated in FIG. 8, the event DB 15 stores therein "Target page, Image capturing date, The number of captured images, Event name" in association with one another. "Target page" indicates a layout target page, and for example, "April" indicates a page for April. "Image capturing date" is the image capturing date of a target image to be arranged on the target page, and a plurality of dates are sequentially input with a comma as a delimiter. When no target event exists, "0" is input. "The number of captured images" is the number of images captured on a target image capturing date, and a plurality of dates are sequentially input in date order with a comma as a delimiter. When no target event exists, "0" is input. "Event name" is the event name of a target event, and "NULL" is input when no event exists.

In the example of FIG. 8, the record for April indicates that 18 images captured on April 29 corresponding to the duration of the event "GW" are classified as event images. The record for June indicates that no image corresponds to an event. A specific file can be specified by using an image capturing date.

The usual-day DB 16 is a database storing therein information on an image classified as a usual-day image. FIG. 9 is a diagram illustrating exemplary information stored in the usual-day DB. In this example, images are classified for each month of a particular year. As illustrated in FIG. 9, the usual-day DB 16 stores therein "Target page, Image capturing date, The number of captured images" in association with one another.

"Target page" indicates a layout target page, and for example, "April" indicates a page for April. "Image capturing date" is the image capturing date of a target image to be arranged on the target page, and a plurality of dates are sequentially input with a comma as a delimiter. When no target date exists, "0" is input. "The number of captured images" is the number of images captured on a target image capturing date, and a plurality of dates are sequentially input in date order with a comma as a delimiter. When no target date exists, "0" is input.

The template DB 17 is a database storing therein, for example, the template of each page for producing an album. The template DB 17 stores therein, for example, a template for producing an event page and a usual page for each month of one year, and a template for producing an event page and a usual page for every two months of one year. The template DB 17 stores therein, for example, the template of each page. The user can optionally select a template from among templates stored in the template DB 17.

The present embodiment describes, as an example, various templates for producing an event page and a usual page for each month of one year. FIG. 10 is a diagram illustrating an exemplary pickup rule stored in the template DB. The pickup rule is information defining which image is picked up in which manner. The image processing device 10 extracts an image from the image DB 11 according to the pickup rule so as to produce an album.

As illustrated in FIG. 10, the pickup rule is defined by using a plurality of tags. For example, "GrowthAlbum" is a tag indicating a growth-recording album, and "VolumeType" indicates the format of the album. To create a separate volume for each year, "Year" is input. To include all pictures in one album, "All" is input. "StartMonth" is a numerical value indicating a starting month when separate volumes are produced. "4" is input in this example, which means that the first volume is for April. "PageOfDuration" indicates a duration of pictures for one page. "Month" is input in this example, which means that the duration is one month.

"FrontPage" is a tag indicating a front page of an album, and is specified to have the front page. "BodyPage" is a tag indicating an album body, which includes an event page and a usual page. "EventPage" is a tag indicating an event page, and is defined in detail with the following tags. "PageNum" indicates the number of event pages and is one page in this example. "Area" indicates area information in an event page, and is defined in detail with the following tags. "FaceThumbnail" indicates the number of pictures included in a face thumbnail area. "LargeFace" indicates the number of pictures included in a large face area. "SmallFace" indicates the number of pictures included in a small face area. "Relation" indicates information included in a relation area, and is defined in detail with the following tags. "RelationType" indicates the type of a relation used in the relation area, and is "Family" for a family. "RelationFace" indicates the number pictures included in the relation area. "UsualPage" indicates a tag indicating a usual page, and is defined in detail with the same tags as those of the event page. "EndingPage" is a tag indicating an ending page and is specified to have an ending page.

The tags illustrated above are exemplary and can be optionally set and changed. For example, the template DB 17 stores therein separately defined tags for the pickup rule and the like for producing an event page and a usual page for every two months of one year.

Figures 11, 12:
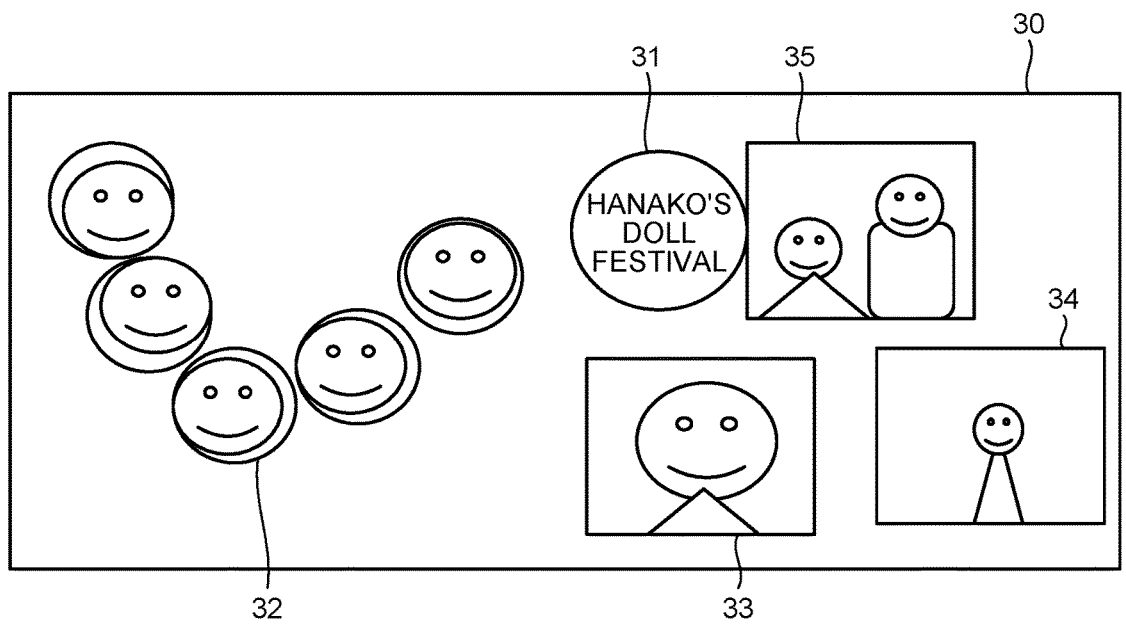
FIG. 11 is a diagram illustrating an exemplary page configuration stored in the template DB.
FIG. 12 is a diagram illustrating an exemplary page layout stored in the template DB.

FIG. 11 is a diagram illustrating an exemplary page configuration stored in the template DB. As illustrated in FIG. 11, the template DB 17 stores therein "Display order, Page content" in association with one another. FIG. 11 illustrates, as an example, an exemplary page configuration for producing an event page and a usual page for each month of one year. The template DB stores therein the page configuration illustrated in FIG. 11 arranged such that a front page is followed by a page of each month displayed in order, and a usual page is followed by an event page for each month. An ending page is displayed in the end of the album.

FIG. 12 is a diagram illustrating an exemplary page layout stored in the template DB. The following describes an example of applying the same page layout to an event page and a usual page, but different layouts may be applied.

As illustrated in FIG. 12, a page 30 includes a page title 31, a face thumbnail area 32, a large face area 33, a small face area 34, and a family picture area 35. Title information is automatically input to the page title 31 based on information on the name of a target object and the name of a target event displayed on the page. For example, "Hanako's Doll Festival" is set for an event page, and "Hanako's usual day" is set for a usual page.

The face thumbnail area 32 is an area for displaying a thumbnail obtained by cutting out a face part of an object in a picture captured at a target event or on a usual day. A picture used in this area is randomly picked up from pictures of the target event, and thumbnails are arranged in an image capturing date order. In this example, five pictures are randomly selected and arranged from left to right in an image capturing date order.

The large face area 33 is an area for displaying a face image of a target object. For this area, a picture in which the ratio of a face region of an object to the entire picture is larger than a particular ratio is selected from among pictures captured at a target event. This is to pick up a closely captured picture of a face.

The small face area 34 is an area for displaying a whole-body image of a target object. For this area, a picture in which the ratio of a face region of an object to the entire picture is smaller than a particular ratio is selected from among pictures captured at a target event. This is to pick up a picture of the whole body or a group picture.

the family picture area 35 is an area for displaying a family image including a target object. A picture in which a family member of an object is photographed together with the object is picked up from among pictures captured at a target event, and is displayed in this area.

Figure 13:
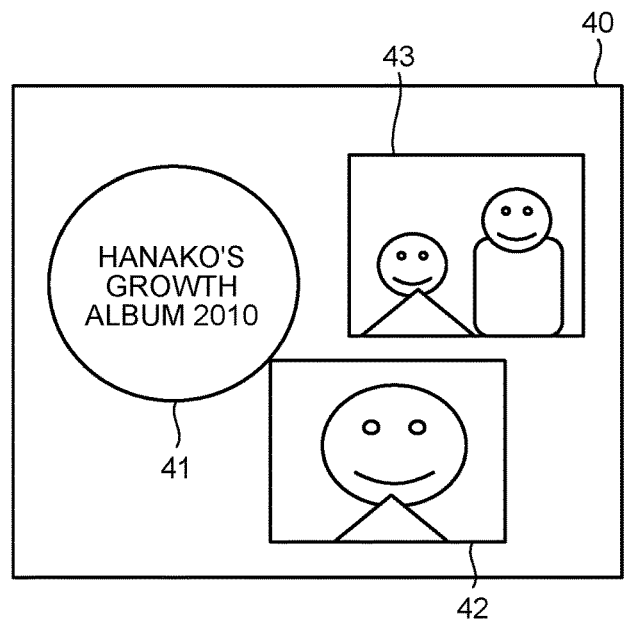
FIG. 13 is a diagram illustrating an exemplary front-page layout stored in the template DB.

FIG. 13 is a diagram illustrating an exemplary front-page layout stored in the template DB. As illustrated in FIG. 13, a front page 40 includes a page title 41, a front page area 42, and a front page area 43.

Title information is automatically input to the page title 41 based on information on the name of a target object and information on a target year for which an album is produced. For example, "Hanako's growth album 2010" is set to the page title 41. Pictures of the target year are randomly picked up and arranged in the front page area 42 and the front page area 43, respectively.

Figure 14:
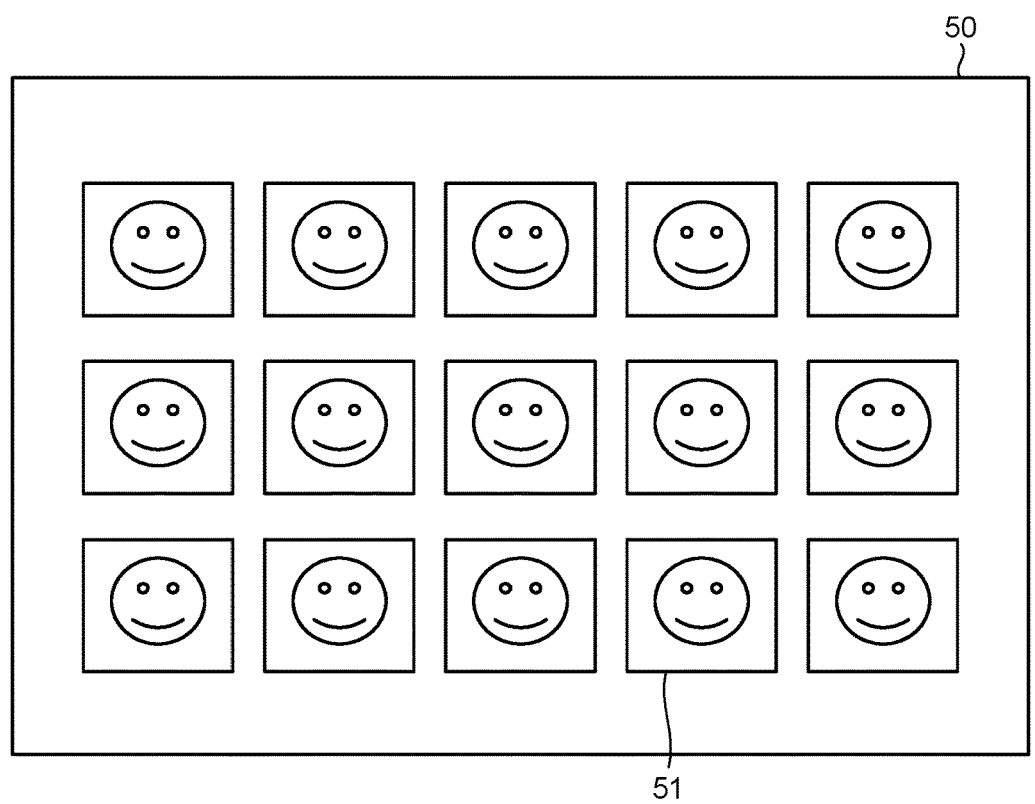
FIG. 14 is a diagram illustrating an exemplary ending-page layout stored in the template DB.

FIG. 14 is a diagram illustrating an exemplary ending-page layout stored in the template DB. As illustrated in FIG. 14, an ending page 50 includes face thumbnail areas 51. Fifteen pictures are randomly picked up from among pictures of a target year, and only face parts thereof are arranged in the face thumbnail areas 51, respectively. This arrangement allows a comparison of growth through the year at a glance, thereby making the album more enjoyable.

Figures 15, 16:
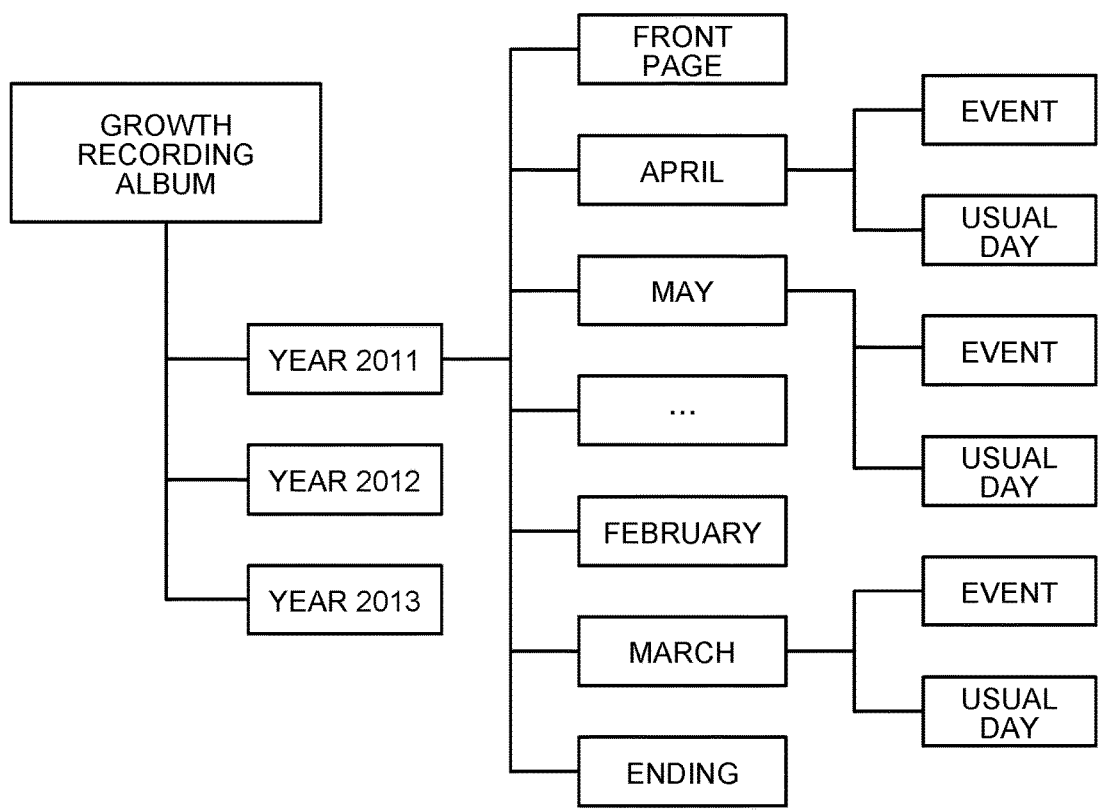
FIG. 15 is a diagram illustrating exemplary layout data stored in the template DB.
FIG. 16 is a diagram illustrating exemplary album information stored in an album DB.

FIG. 15 is a diagram illustrating exemplary layout data stored in the template DB. FIG. 15 lists an exemplary range of each area in each page 30. The template DB 17 stores therein similar information for the front page and the ending page.

As illustrated in FIG. 15, the template DB 17 stores therein "Place, Position, Size" in association with one another as information on each area of each page 30. As described above, the template DB 17 stores therein information on a position at which a thumbnail area in the page is arranged, and definition of the size of a picture. "Place" indicates a target thumbnail, "Position" indicates the position of the upper-left corner of a thumbnail image, and "Size" indicates vertical and horizontal sizes. The upper-left corner of "Large face area" in FIG. 15 is positioned at "1000, 800", and the size thereof is "1200, 1200", which indicates a square.

In FIG. 2, the album DB 18 is a database storing therein a produced album. FIG. 16 is a diagram illustrating exemplary album information stored in the album DB. As illustrated in FIG. 16, the album DB 18 stores therein a front page, an event page and a usual page of each month, and an ending page in association with each year.

Figure 17:
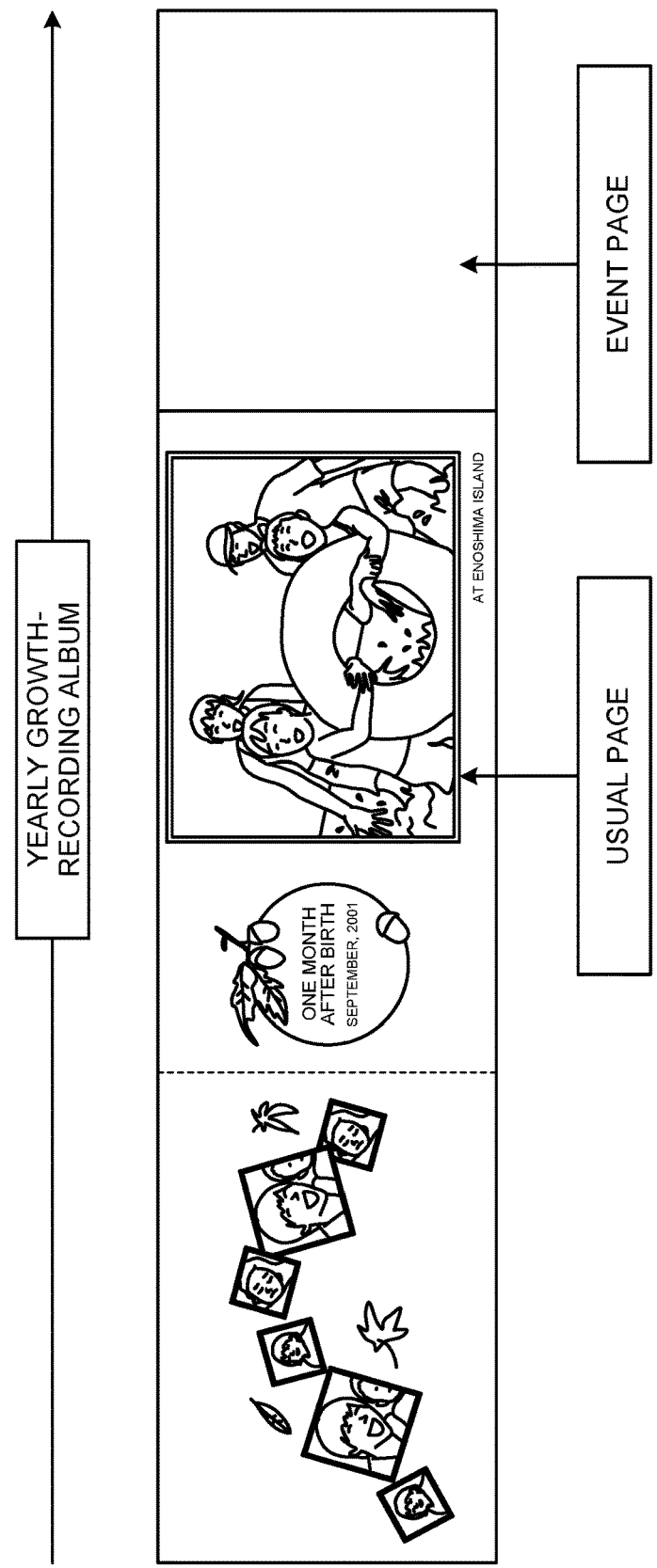
FIG. 17 is a diagram illustrating an exemplary album stored in the album DB.

FIG. 17 is a diagram illustrating an exemplary album stored in the album DB. As illustrated in FIG. 17, the album DB 18 stores therein an album as a collection for each year. In the stored album, an event page and a usual page are alternately arranged and switched over when scrolled laterally.

The following describes each processing unit. The object recognition unit 20 is a processing unit configured to execute image recognition on each image stored in the image DB 11 to generate the object DB 12 and the object information DB 13. Examples of the object recognition unit 20 include the image processing application.

For example, the object recognition unit 20 executes face recognition on each image to specify a face image in the image. Then, the object recognition unit 20 receives, from the user, information on whose face image is indicated in the specified face image, associates the face image with the user, and also specifies whose face image is photographed in which image.

The event determination unit 21 is a processing unit configured to determine whether each image stored in the image DB 11 corresponds to an event or a usual day, and classify the image. Specifically, the event determination unit 21 compares the image capturing date of the image and each event duration stored in the event list DB 14 to classify the image as an event image or a usual-day image and store the image in the event DB 15 or the usual-day DB 16.

For example, images captured in April are four images on April 7 and 18 images on April 29. Among these, April 29 corresponds to the event GW in the event list DB 14, and thus the event determination unit 21 sets April 29 as an event for a page of April, and records April 29 as an image capturing date. The event determination unit 21 also records 18, which is the number of pictures captured on the day, as the number of captured images, and records GW as an event name.

For example, images captured in November are 12 images on November 11 and five images on November 23. In this case, both dates are not in the event list, and thus the event determination unit 21 compares the numbers of captured images with the event minimum number. The event determination unit 21 determines that the number of captured images for November 11, which is 12, is larger than the event minimum number of 10, and five for November 23 is smaller than the event minimum number. Accordingly, the event determination unit 21 determines that an event for a page of November has been held on November 11. Thus, the event determination unit 21 records November 11 as an image capturing date and 12 as the number of captured images. Because no event name is available, the event determination unit 21 records the event name of "The number of images". The album is controlled not to display the event name of "The number of images".

The object selection unit 22 is a processing unit configured to receive selection of an album production target object from the user. Specifically, the object selection unit 22 displays an object list on a screen to allow selection of a target person through a user operation on the screen. The object selection unit 22 sets a selected person as an album target.

For example, the object selection unit 22 specifies an object ID based on information stored in the object information DB 13, and specifies the image ID corresponding to this object ID. Then, the object selection unit 22 displays an image corresponding to the specified ID on, for example, a display, and displays a face region on the displayed image with a frame or the like. In this state, the object selection unit 22 receives selection of a target person for which an album is produced.

The image selection unit 23 is a processing unit configured to pick up an image relevant for a growth record when a person is selected as an album target. Specifically, the image selection unit 23 receives a condition to produce the album from the user and picks up an image according to template data corresponding to the received condition. Then, the image selection unit 23 notifies the image layout unit 24 of information on a selected template and information on a selected image.

The following describes an example of pickup processing for an event page of April. The image selection unit 23 refers to the event DB 15 and determines that the image capturing date of April 29 is specified for an event. Thus, the image selection unit 23 picks up pictures to be arranged in respective areas from among 18 pictures captured on April 29.

First, the image selection unit 23 picks up pictures photographed with a family member from among the 18 pictures, and sets the picture as candidates for the family picture area 35. The image selection unit 23 arranges the rest of pictures in a descending order of face size ratio, and sets the first half of the arranged pictures as candidates for the large face area 33, and the second half thereof as candidates for the small face area 34.

Subsequently, the image selection unit 23 selects one picture for each area from among the candidates for the family picture area 35, the candidates for the large face area 33, and the candidates for the small face area 34. When a plurality of candidates are available at selection, the image selection unit 23 selects a nicely photographed picture first. When no candidate is available, the image selection unit 23 randomly picks up a picture from among pictures not picked up for any area among all target pictures.

Thereafter, the image selection unit 23 randomly selects five pictures for the face thumbnail area 32 from among 15 pictures not picked up for the large face area 33, the small face area 34, and the family picture area 35.

The above-described pickup processing for each area is exemplary when the priority is higher in this order of the family picture area 35, the large face area 33, the small face area 34, and the face thumbnail area 32, and the processing may be optionally set and changed. The image selection unit 23 also performs the pickup processing for other pages by using the same logic as described above. The image selection unit 23 does not need to distinguish an event and a usual day for a front page and an ending page, and thus picks up pictures from among all target pictures.

The image layout unit 24 is a processing unit configured to produce, for each duration, an event page including event images of an event in the duration and a usual page including usual-day images in the duration. Specifically, the image layout unit 24 arranges each picture selected by the image selection unit 23 at a certain position in a template for each page and generates the page. Then, the image layout unit 24 outputs the page including the picture to the album production unit 25.

In other words, the image layout unit 24 arranges a picture picked up through the pickup processing by the image selection unit 23, according to information of layout data. When the layout data has a size smaller than the size of the picture to be arranged, the image layout unit 24 trims the picture so that the face of an object is included and arranges the picture.

The album production unit 25 is a processing unit configured to generate an album by using an event page and a usual page produced for each duration. In the example described above, the album production unit 25 produces an album including an alternate arrangement of a usual page and an event page for each month from April to March. For a month with no usual page nor event page, the album production unit 25 deletes the page. When specified by the user, for example, the album production unit 25 may produce an album in an order of a usual page and an event page or in an order of an event page and a usual page.

The album production unit 25 outputs a produced album as data of a growth-recording album to the album DB 18. For example, the album production unit 25 outputs the album in a Hyper Text Markup Language (HTML) format. Screen layout information may be included in HTML. Screen animation can be operated based on a script written in HTML.

The above processing produces a growth-recording album with animation in the HTML format. This growth-recording album includes a separate volume for each year, and the separate volume includes monthly pages. The monthly pages each include arrangement of pictures captured on usual days of the month followed by pictures captured at an event of the month, which allows observation of the growth of a child and remembering of memories of the event. The ending page includes a list of arranged face pictures of the child in a target year, which allows observation of the growth of the child at a glance.

Process of Processing

The following describes processing executed by the image processing device 10 in detail. The process of the entire processing will be described first, and then the process of each piece of processing will be described in detail.

Entire Processing

Figure 18:
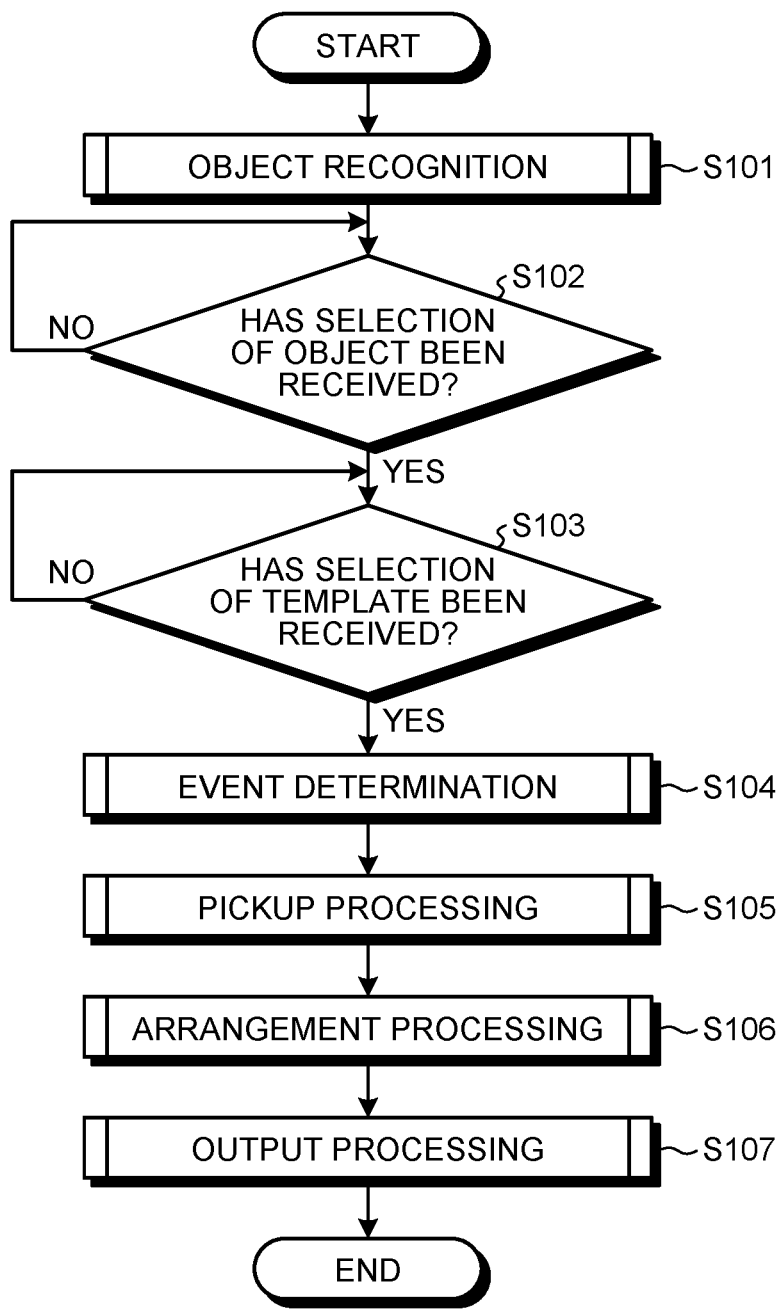
FIG. 18 is a flowchart of the entire process of album production.

FIG. 18 is a flowchart of the process of the entire processing of album production. As illustrated in FIG. 18, the image processing device 10 executes object recognition (S101), and then receives selection of an album production target object (S102).

Having received selection of the object (Yes at S102), the image processing device 10 receives selection of a template (S103). In this selection, the image processing device 10 receives selection of an album of which page configuration in which duration to be produced.

Thereafter, having received selection of the template (Yes at S103), the image processing device 10 executes event determination (S104). Then, having completed the event determination, the image processing device 10 executes pickup processing (S105).

Thereafter, the image processing device 10 executes arrangement processing that arranges a picture or the like picked up by the pickup processing at a certain position on each page to produce an album (S106), and executes output processing that stores the produced album in the album DB 18 (S107).

Object Recognition

Figure 19:
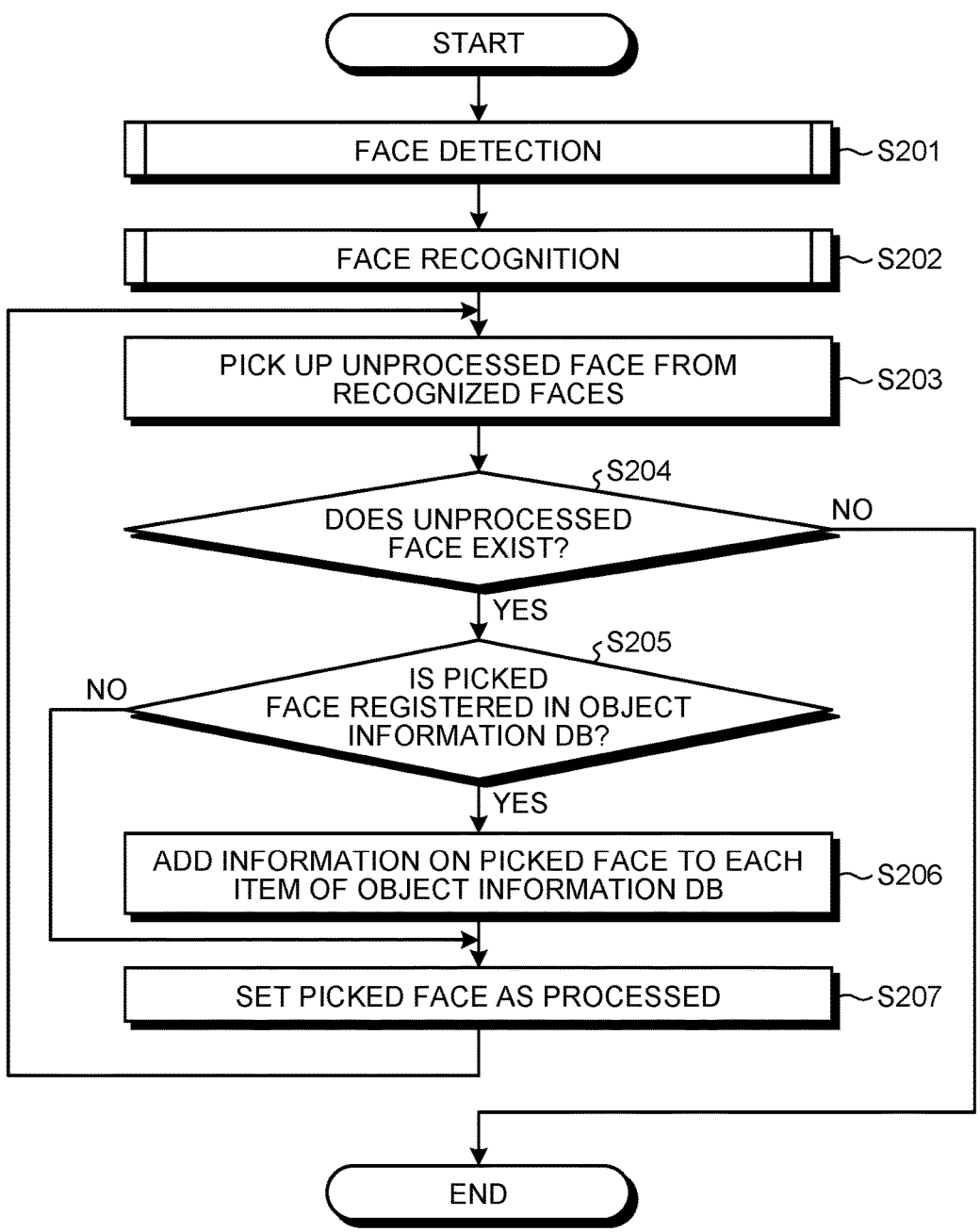
FIG. 19 is a flowchart of the process of object recognition.

FIG. 19 is a flowchart of the process of the object recognition. This processing corresponds to S101 in FIG. 18. As illustrated in FIG. 19, the object recognition unit 20 executes face detection on each image stored in the image DB 11 (S201), and then executes face recognition (S202).

Thereafter, the object recognition unit 20 picks up an unprocessed face from information on a list of faces recognized by the face recognition, (S203). Subsequently, when an unprocessed face exists (Yes at S204), the object recognition unit 20 determines whether the picked face is a face registered in the object information DB 13 (S205). At S204, when no unprocessed face exists (No at S204), the object recognition unit 20 ends the process.

When the picked face is registered in the object information DB 13 (Yes at S205), the object recognition unit 20 adds information to each item of the object information DB 13 (S206). For example, the object recognition unit 20 adds the image ID of an image in which a face is photographed to an image ID cell of the object information DB 13. The object recognition unit 20 also adds the object ID of a matched image to an object ID cell of the object information DB 13. The object recognition unit 20 also adds a region in which a face is photographed to an object region cell of the object information DB 13.

Thereafter, the object recognition unit 20 sets the picked face as processed (S207), and repeats S203 and the following. When the picked face is not registered in the object information DB 13 (No at S205), the object recognition unit 20 executes S207 without executing S206.

Face Detection

Figure 20:
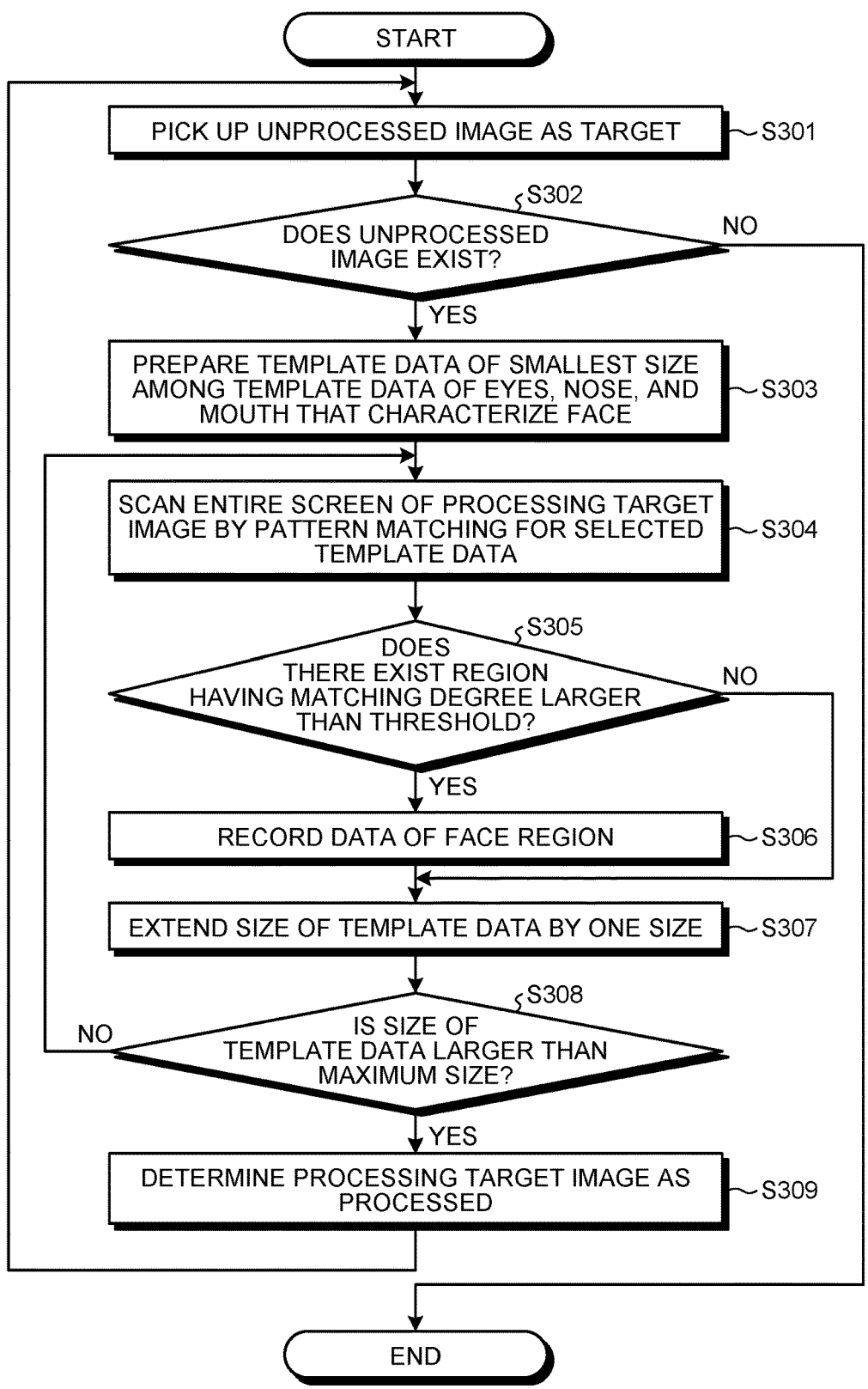
FIG. 20 is a flowchart of the process of face detection in the object recognition.

FIG. 20 is a flowchart of the process of the face detection in the object recognition. This processing corresponds to S201 in FIG. 19. As illustrated in FIG. 20, the object recognition unit 20 picks up an unprocessed image as a face detection target (S301), and determines whether an unprocessed image exists (S302). When no unprocessed image exists (No at S302), the object recognition unit 20 ends the process.

Subsequently, when an unprocessed image exists (Yes at S302), the object recognition unit 20 reads out data of the smallest size among template data of eyes, a nose, and a mouth that characterize the face, the data being stored in the device in advance (S303).

Then, for a selected template data, the object recognition unit 20 scans the entire screen of a processing target image by pattern matching (S304). For example, the object recognition unit 20 executes the scanning by repeating processing that shifts the template data relative to an image screen in the lateral direction and executes calculation, shifts the template data downward when having reached at the rightmost position, and then shifts the template data in the lower lateral direction to execute calculation.

Thereafter, the object recognition unit 20 determines whether there exists a region having a matching degree obtained at S304 larger than a threshold stored in advance in the device (S305).

Then, when there exists a region having the matching degree larger than the threshold (Yes at S305), the object recognition unit 20 records data of a face region in a memory or the like (S306). Specifically, the object recognition unit 20 records a specified region when the region is not overlapped, or records a region having a largest matching degree when the region is overlapped.

Thereafter, the object recognition unit 20 extends the size of the template data by one size (S307). Specifically, the object recognition unit 20 selects a template data having a size one size larger than that of the selected template data. When there exists no region having the matching degree larger than the threshold (No at S305), the object recognition unit 20 executes S307 without executing S306.

Then, when the size of the extended template data is larger than a maximum size (Yes at S308), the object recognition unit 20 determines the processing target image as processed (S309), and repeats S301 and the following.

When the size of the extended template data is smaller than the maximum size (No at S308), the object recognition unit 20 repeats S304 and the following.

Face Recognition

Figure 21:
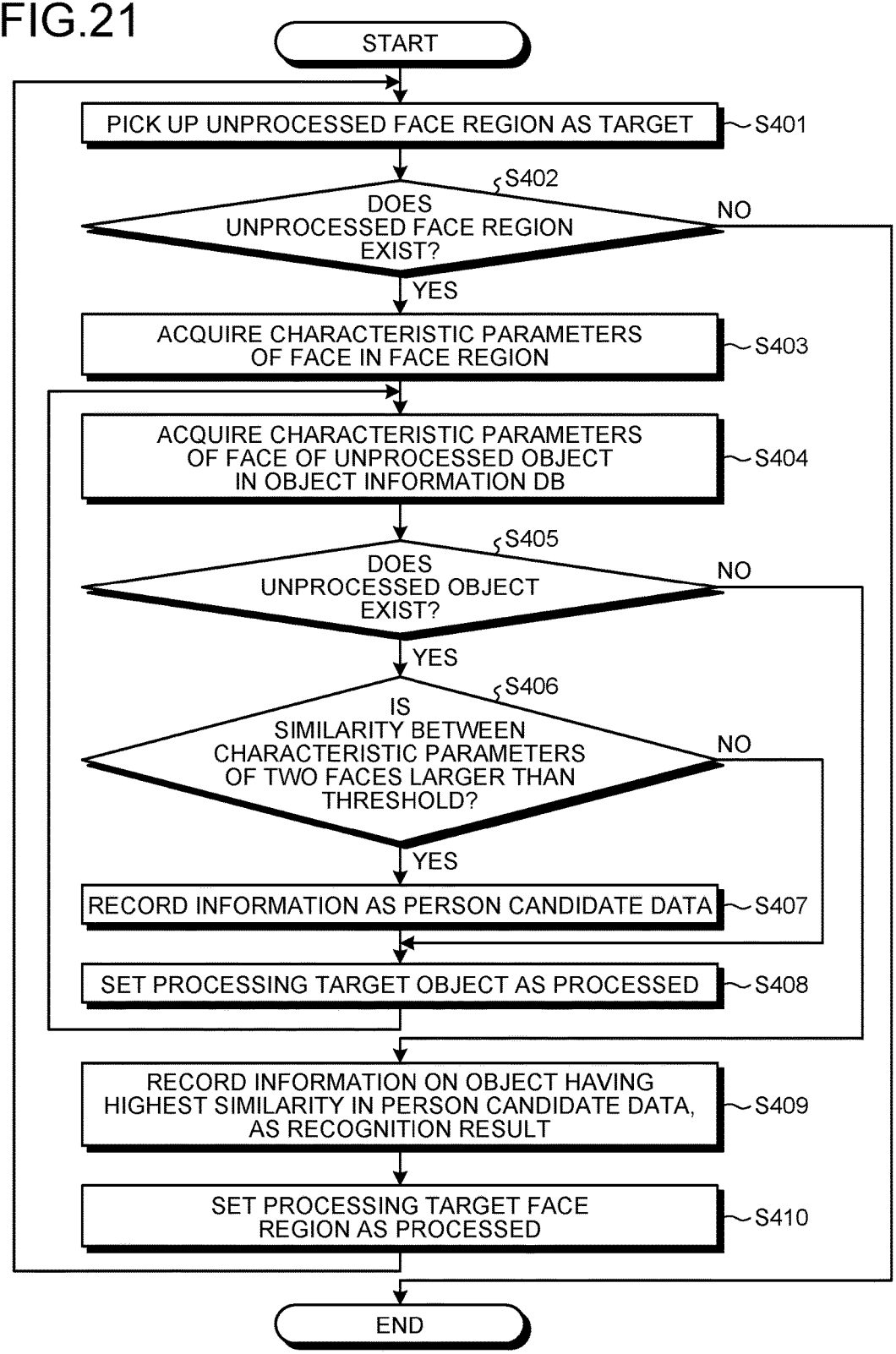
FIG. 21 is a flowchart of the process of face recognition in the object recognition.

FIG. 21 is a flowchart of the process of the face recognition in the object recognition. This processing corresponds to S202 in FIG. 19. As illustrated in FIG. 21, the object recognition unit 20 picks up an unprocessed face region as a face recognition target (S401).

Subsequently, the object recognition unit 20 determines whether an unprocessed face region exists (S402). When no unprocessed face region exists (No at S402), the object recognition unit 20 ends the process.

When an unprocessed face region exists (Yes at S402), the object recognition unit 20 acquires characteristic parameters of a face in the face region (S403). For example, the object recognition unit 20 acquires parameters as vector data of, for example, the positions of eyes, the position of a nose, and the position of a mouth relative to the entire face.

Then, the object recognition unit 20 acquires characteristic parameters of the face of an unprocessed object in the object information DB 13 (S404). Subsequently, when the object information DB 13 includes an unprocessed object (Yes at S405), the object recognition unit 20 executes S406. In other words, the object recognition unit 20 determines whether the characteristic parameters of the face acquired at S403 and the characteristic parameters of the face acquired at S404 have a similarity therebetween larger than a threshold. The similarity can be calculated by calculating, for example, a distance between two vectors of characteristic parameters, and setting the similarity to be one when the distance is zero.

When the similarity is larger than the threshold (Yes at S406), the object recognition unit 20 records information as person candidate data in the memory or the like (S407). For example, the object recognition unit 20 records information on the face region, an object ID in the object information DB 13, and the similarity. Thereafter, the object recognition unit 20 sets the processing target object as processed (S408), and repeats S404 and the following.

At S406, when the similarity is smaller than the threshold (No at S406), the object recognition unit 20 executes S408 without executing S407.

At S405, having determined that the object information DB 13 includes no unprocessed object (No at S405), the object recognition unit 20 records information on an object having the highest similarity in the person candidate data, as a recognition result in the memory or the like (S409). For example, the object recognition unit 20 records information on the face region and an object ID in the object information DB 13.

When no person candidate data is available, the object recognition unit 20 outputs none. When one piece of person candidate data is available, the object recognition unit 20 outputs the value of the candidate data. When a plurality of pieces of person candidate data are available, the object recognition unit 20 outputs data having the highest similarity among them. Then, the object recognition unit 20 sets the face region as a processing target as processed (S410), and repeats S401 and the following.

Event Determination

Figure 22:
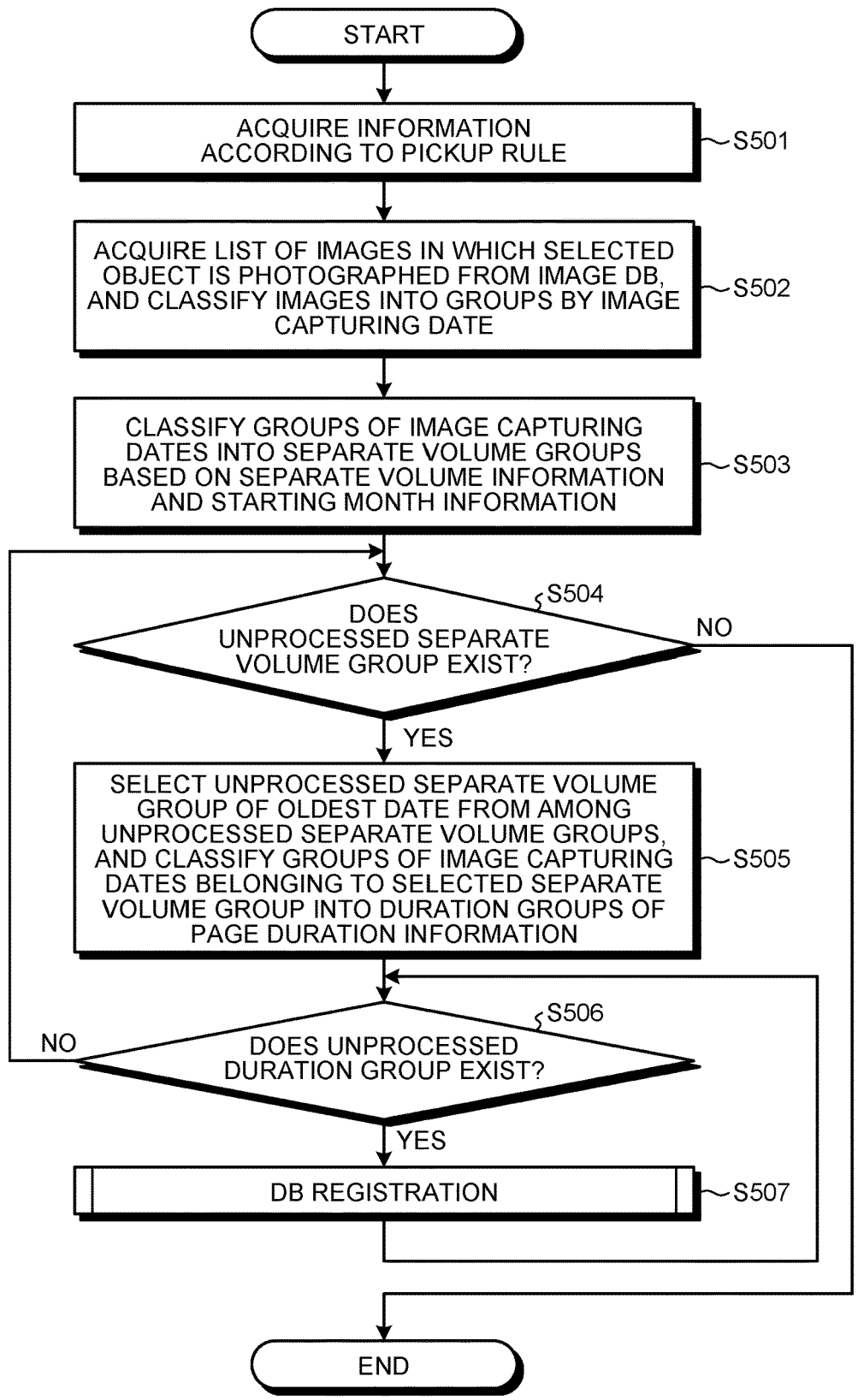
FIG. 22 is a flowchart of the process of event determination.

FIG. 22 is a flowchart of the process of the event determination. This processing corresponds to S104 in FIG. 18.

As illustrated in FIG. 22, the event determination unit 21 acquires information according to the pickup rule corresponding to an album production condition received from the user among a plurality of pickup rules stored in the template DB 17 (S501).

Specifically, the event determination unit 21 acquires information on VolumeType, StartMonth, and PageOfDuration from the pickup rule information for the template selected by the template data selection. Then, the event determination unit 21 sets information acquired from VolumeType as separate volume information, information acquired from StartMonth as starting month information, and information acquired from PageOfDuration as page duration information.

Subsequently, the event determination unit 21 acquires a list of images in which an object selected by the object selection unit 22 is photographed, from images stored in the image DB 11, and classifies the images into groups by image capturing date (S502).

Then, the event determination unit 21 classifies the groups of image capturing dates into separate volume groups based on the separate volume information and the starting month information (S503). In the present embodiment, because a year starts at April, the event determination unit 21 classifies the groups by a year "from April to March in the next year". When "All" is set to the VolumeType of the pickup rule, the number of separate volume groups is one.

Thereafter, the event determination unit 21 determines whether an unprocessed separate volume group exists (S504). When no unprocessed separate volume group exists (No at S504), the event determination unit 21 ends the process.

When an unprocessed separate volume group exists (Yes at S504), the event determination unit 21 executes S505. Specifically, the event determination unit 21 selects an unprocessed separate volume group of the oldest date from among unprocessed separate volume groups. Subsequently, the event determination unit 21 classifies groups of image capturing dates belonging to the selected separate volume group into duration groups of page duration information. In the present embodiment, because page duration information indicates units of months, the event determination unit 21 classifies the groups of image capturing dates belonging to the selected separate volume group into groups of months.

Thereafter, the event determination unit 21 determines whether an unprocessed duration group exists (S506). In the present embodiment, the event determination unit 21 determines whether an unprocessed month group exists.

When an unprocessed duration group exists (Yes at S506), the event determination unit 21 executes DB registration (S507), and repeats S506. When no unprocessed duration group exists (No at S506), the event determination unit 21 repeats S504 and the following.

DB Registration

Figure 23:
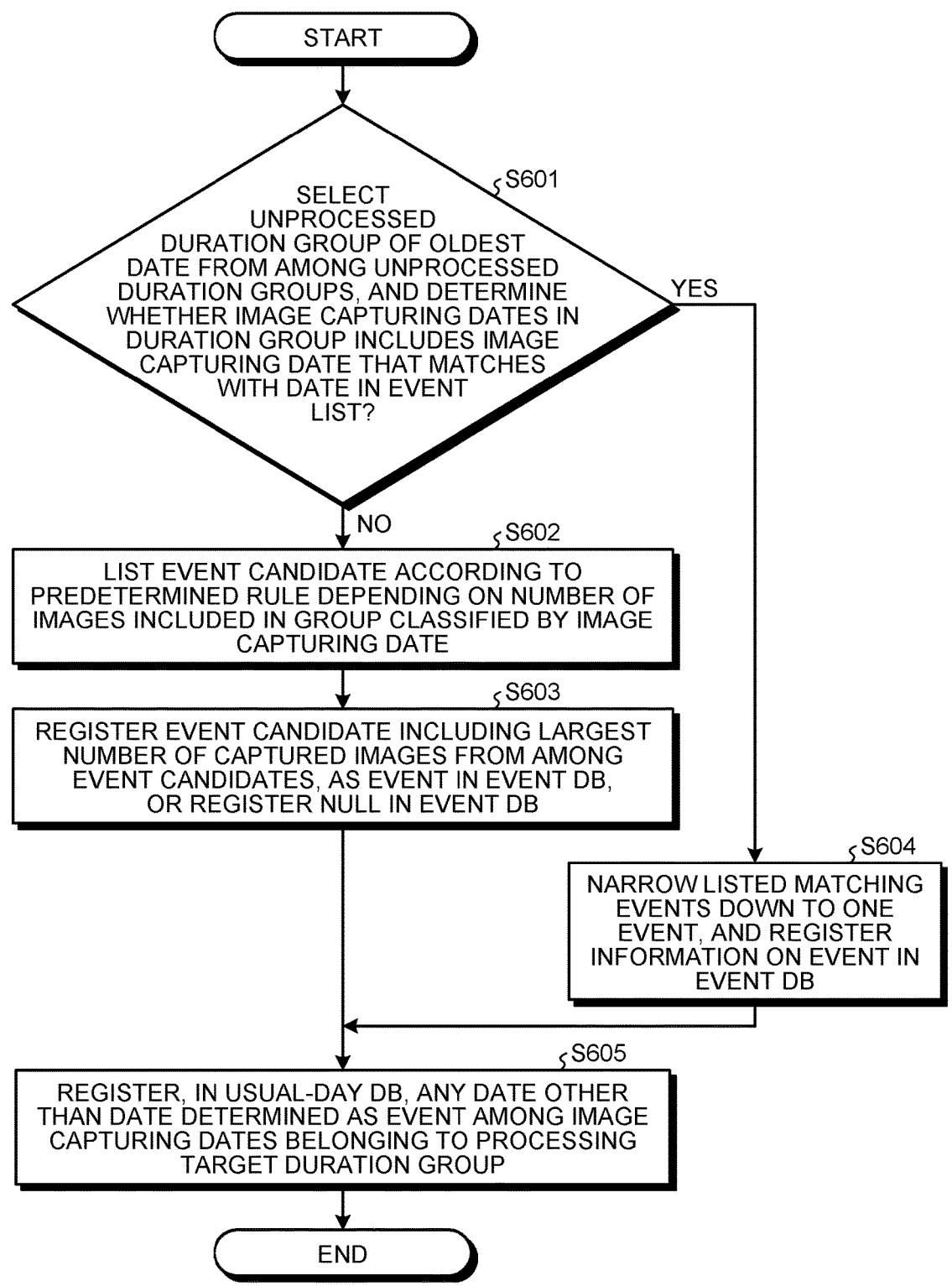
FIG. 23 is a flowchart of the process of DB registration in the event determination.

FIG. 23 is a flowchart of the process of the DB registration in the event determination. This processing corresponds to S507 in FIG. 22.

As illustrated in FIG. 23, the event determination unit 21 selects an unprocessed duration group of the oldest date from among unprocessed duration groups, and determines whether image capturing dates in the duration group includes an image capturing date that matches with a date in the event list DB 14 (S601).

Then, when no matching image capturing date is included (No at S601), the event determination unit 21 lists an event candidate according to a predetermined rule depending on the number of images included in the group classified by an image capturing date (S602).

Specifically, the event determination unit 21 compares the number of images included in the group classified by the image capturing date with the "event minimum number" defined by the system. When the number of images is larger than the event minimum number, the event determination unit 21 sets the date as the event candidate. After event candidates are listed for all image capturing dates belonging to the duration group, the event determination unit 21 sets any continuous dates collectively as an event candidate.

Thereafter, the event determination unit 21 executes registration in the event DB 15 (S603). Specifically, when event candidates exist, the event determination unit 21 registers an event candidate including a largest number of captured images from among the event candidates, as an event in the event DB 15. When no event candidate exists, the event determination unit 21 registers "NULL" in the event DB 15.

At S601, when a matching image capturing date is included (Yes at S601), the event determination unit 21 narrows listed matching events down to one event, and registers information on the event in the event DB 15 (S604). For example, when only one event exists, the event determination unit 21 registers the event. When a plurality of events exists, the event determination unit 21 compares the priorities of the events to select an event with the highest priority. When a plurality of events have the same priority, the event determination unit 21 selects an event having a largest number of images. When the number of images is the same between events, the event determination unit 21 randomly selects one event.

Having executed S603 or S604, the event determination unit 21 registers, in the usual-day DB 16, any date other than the date determined as an event at S603 or S604 among the image capturing dates belonging to the duration group as a processing target (S605).

Pickup Processing

Figure 24:
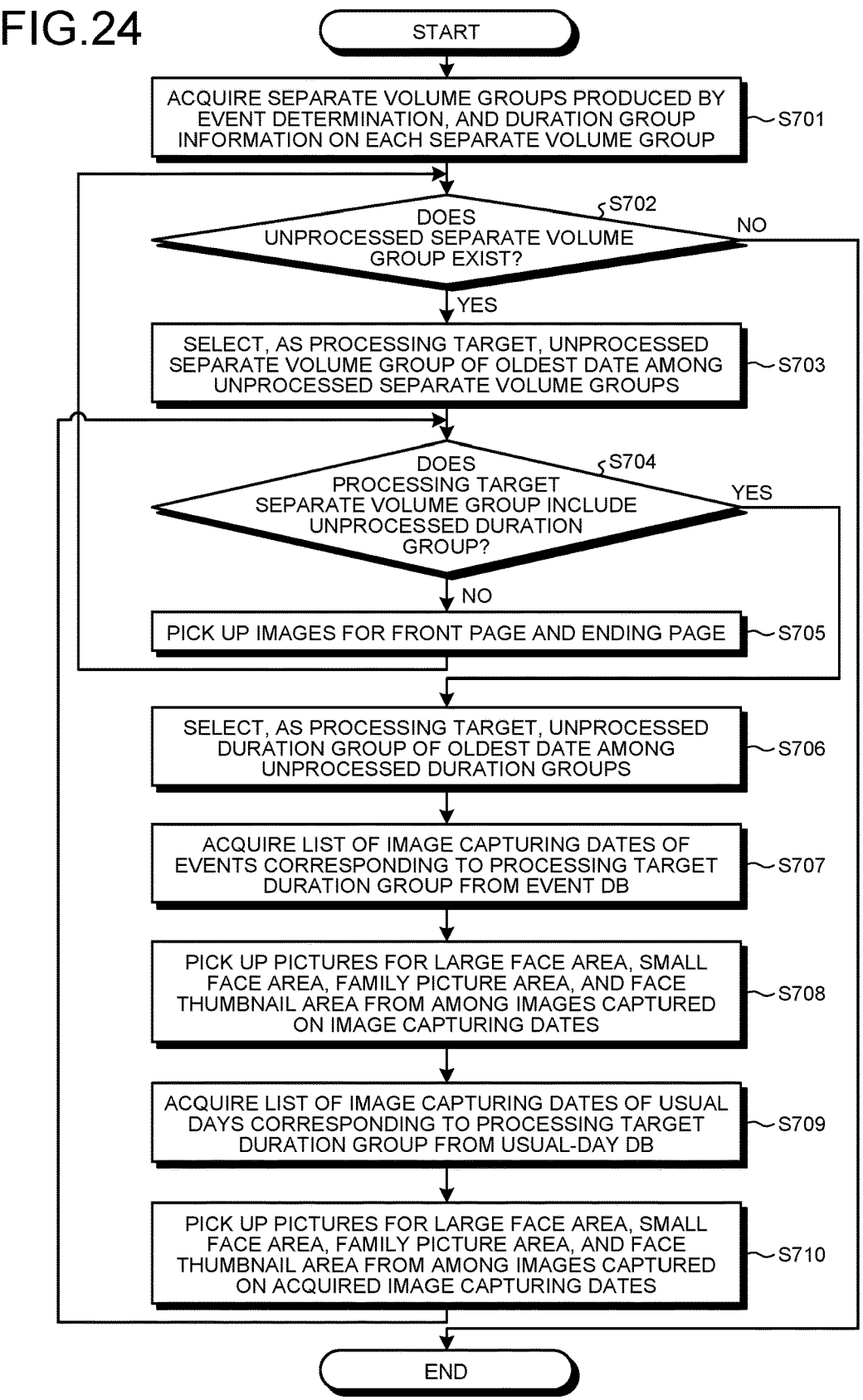
FIG. 24 is a flowchart of the process of pickup processing.

FIG. 24 is a flowchart of the process the pickup processing. This processing corresponds to S105 in FIG. 18. As illustrated in FIG. 24, the image selection unit 23 acquires the separate volume groups produced by the event determination, and duration group information on each separate volume group (S701).

Then, the image selection unit 23 determines whether any unprocessed separate volume group exists (S702). When no unprocessed separate volume group exists (No at S702), the image selection unit 23 ends the process.

When any unprocessed separate volume group exists (Yes at S702), the image selection unit 23 selects, as a processing target, an unprocessed separate volume group of the oldest date among the unprocessed separate volume groups, (S703).

Subsequently, the image selection unit 23 determines whether the processing target separate volume group includes an unprocessed duration group (S704). When the processing target separate volume group includes no unprocessed duration group (No at S704), the image selection unit 23 picks up images for a front page and an ending page (S705), and repeats S702 and the following.

When the processing target separate volume group includes an unprocessed duration group (Yes at S704), the image selection unit 23 selects, as a processing target, an unprocessed duration group of the oldest date among the unprocessed duration groups (S706).

Then, the image selection unit 23 acquires a list of the image capturing dates of events corresponding to the processing target duration group from the event DB 15 (S707). For example, for "event page of April", the image selection unit 23 finds that "4/29" is an image capturing date of a page of April in the event DB 15, and thus acquires this date.

Subsequently, the image selection unit 23 executes S708 using an image captured on the image capturing date of an event acquired at S707. In other words, the image selection unit 23 picks up pictures for the large face area 33, the small face area 34, the family picture area 35, and the face thumbnail area 32 from among the captured images. When there is no image on the image capturing date of the event, the image selection unit 23 proceeds to the next step without performing any processing.

Thereafter, the image selection unit 23 acquires a list of image capturing dates of usual days corresponding to the processing target duration group from the usual-day DB 16 (S709). For example, for "usual page of July", the image selection unit 23 finds that "7/12, 7/23, 7/31" are image capturing dates of a page of July in the usual-day DB 16, and thus uses theses dates as dates of usual days.

Then, the image selection unit 23 picks up pictures for the large face area 33, the small face area 34, the family picture area 35, and the face thumbnail area 32 from among images captured on the image capturing dates of the usual days acquired at S709 (S710). The image selection unit 23 performs no processing when there is no image on the image capturing dates of the usual days. Thereafter, the image selection unit 23 repeats S704 and the following.

Effects

In this manner, the image processing device 10 can produce an album of which information is less biased. For example, the image processing device 10 can produce an album as a growth record of a child including a page of pictures captured at events such as a birthday, New Year's day, the close of winter, and Christmas, and a page of pictures captured on usual days at a park and an amusement park and the like. Thus, the image processing device 10 can produce an album including automatically arranged pictures and videos having such distributions that the growth of the child is observable.

In addition, the image processing device 10 can optionally set and changes a pickup rule and a page format and thus can produce an album suitable to a demand of a user. This facilitates increase in the number of users.

[b] Second Embodiment

The embodiment of the present invention is described above, but the present invention may be also achieved in various kinds of different modes other than the above-described embodiment.

Automatic Editing of Page with No Picture

For example, the image processing device 10 can exclude an event page with no image among event pages and a usual page with no image among usual pages from an album to be generated. Specifically, the image processing device 10 automatically deletes pages in which no picture is arranged. As a result, when there is no image of an event or a usual day, the image processing device 10 can delete the corresponding page from an album to be produced, thereby preventing production of an odd album with blank pages.

Selection of Event

For example, when there are a plurality of events in a duration, the image processing device 10 specifies an event with the largest number of images and determines the specified event to be an event in this duration. For usual pages in this duration, the image processing device 10 determines images in the duration except for the date of the determined event, to be images of the usual day.

Then, the image processing device 10 generates event pages including images of the determined event, and usual pages including images of the determined usual day. As a result, the image processing device 10 can generate event pages and usual pages even for a month having a plurality of events, thereby producing an album including automatically arranged pictures and videos having such distributions that the growth of a child is observable.

Sharing of Album

The image processing device 10 can transmit a produced album as HTML data to other devices. This allows the album to be browsed on the other devices. In addition, the image processing device 10 can print the produced album through a printer.

Use of Cloud System

The image processing device 10 may be provided on a cloud system. For example, a user stores images in the image processing device 10 on the cloud system and produces an album. This allows the user to execute production, editing, and browsing of an album independently from terminals.

Use of Moving Images

The embodiment describes the example in which an album is produced mainly with still images, but the present invention is not limited thereto. For example, the image processing device 10 can perform similar processing by treating a moving image as a series of still images. The image processing device 10 can arrange a moving image on each page and thus produce an album that plays back the moving image on a Web.

System

All or part of the processing described to be automatically executed among the pieces of processing described in the present embodiment may be manually executed. Alternatively, all or part of the processing described to be manually executed may be automatically executed by a known method. In addition, processing procedures, control procedures, specific names, and information including various data and parameters described in the above description and the drawings can be optionally changed unless otherwise stated.

In addition, each component of each apparatus illustrated in the drawings is functionally conceptual and thus does not always physically configured as illustrated in the drawings. In other words, specific configuration of distribution and integration of the devices is not limited to those illustrated. Thus, all or part of the configuration can be distributed or integrated functionally or physically in optional units depending on various loads and use conditions. Moreover, all or an optional part of the processing functions executed by the devices can be achieved by a central processing unit (CPU) and a computer program analyzed and executed by this CPU, or can be achieved as wired logic hardware.

Hardware

Figure 25:
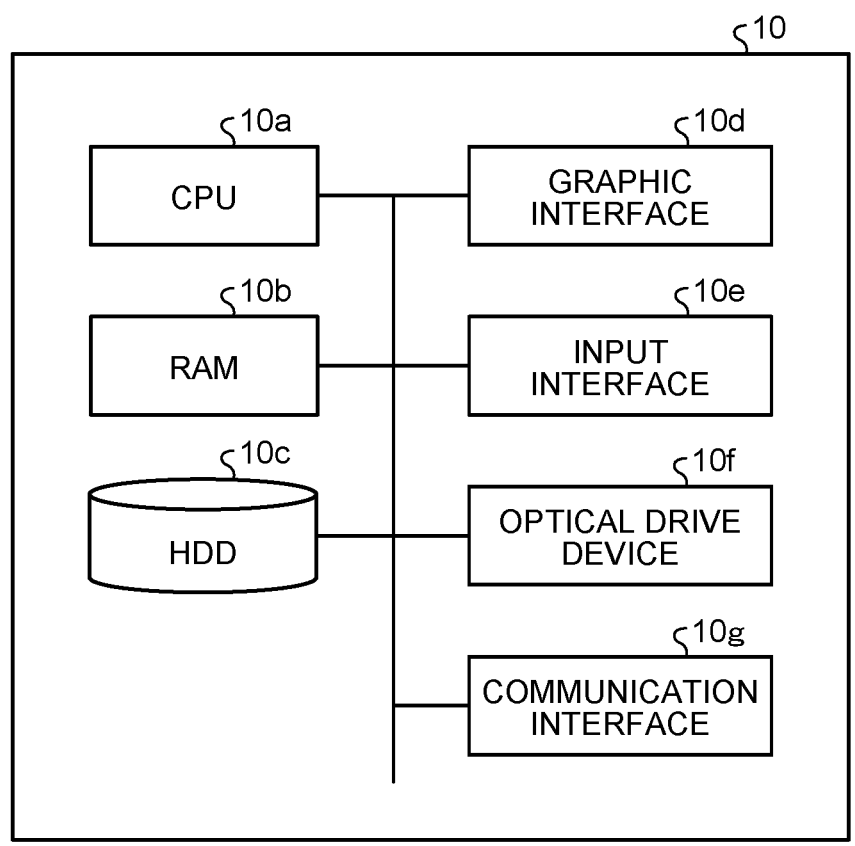
FIG. 25 is a diagram illustrating an exemplary hardware configuration.

FIG. 25 is a diagram illustrating an exemplary hardware configuration. As illustrated in FIG. 25, the image processing device 10 includes a CPU 10a, a random access memory (RAM) 10b, a hard disk drive (HDD) 10c, a graphic interface 10d, an input interface 10e, an optical drive device 10f, and a communication interface 10g. The components illustrated in FIG. 13 are connected with each other through a bus, for example.

The HDD 10c stores therein a DB and a computer program for operating functions illustrated in, for example, FIG. 2. The graphic interface 10d is connected with a display device such as a display and outputs various kinds of information to the display device. The input interface 10e is connected with, for example, a mouse and a keyboard and receives various kinds of input information. The optical drive device 10f is an exemplary device configured to read an image from an external medium, for example, from an optical disk. The communication interface 10g is an interface configured to control communication with other devices, and is a network interface card, for example.

The CPU 10a operates a process that executes functions described with reference to FIG. 2 and the like by reading out a computer program for executing the same processing as those of the processing units illustrated in FIG. 2 and the like from, for example, the HDD 10c and loading the program onto the RAM 10b.

In other words, this process executes the same functions as those of the processing units included in the image processing device 10. Specifically, the CPU 10a reads out, from the HDD 10c and the like, a computer program having the same functions as those of the object recognition unit 20, the event determination unit 21, the object selection unit 22, the image selection unit 23, the image layout unit 24, the album production unit 25, and the like. Then, the CPU 10a executes the process that executes the same processing as those of the object recognition unit 20, the event determination unit 21, the object selection unit 22, the image selection unit 23, the image layout unit 24, and the album production unit 25.

In this manner, the image processing device 10 operates as an information processing device configured to execute an album producing method by reading out and executing a computer program. The image processing device 10 can achieve the same functions as those of the above-described embodiments by reading out the computer program from a recording medium through a medium reading device, and executing the read program. A computer program in other embodiments is not limited to execution by the image processing device 10. For example, the present invention is also applicable to a case in which other computers or servers execute the computer program, and a case in which these computers and servers cooperatively execute the computer program.

According to one embodiment, an album having a reduced information bias can be produced.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an album producing program that causes a computer to execute a process comprising:
   classifying captured images into event images captured in event duration and usual-day images captured on a usual day in routine event duration excepted from the event duration, the event duration and the routine event duration being included in a predetermined duration;
   producing, for an individual album production target duration, an event page in which event images captured in the album production target duration are inserted and a usual page in which usual-day images captured in the album production target duration are inserted; and
   generating an album using the event page and the usual page produced for the album production target duration.

2. The non-transitory computer-readable recording medium having stored therein the album producing program according to claim 1, wherein when there are a plurality of events in the event duration, the producing includes specifying a first event with a largest number of the event images, producing the event page in which event images of the specified first event are inserted, and producing the usual page in which the usual-day images in the event duration and event images of an event other than the first event in the event duration are inserted.

3. The non-transitory computer-readable recording medium having stored therein the album producing program according to claim 1, wherein the producing includes producing the event page or the usual page including a page title, a thumbnail area including images randomly selected from among the corresponding images and arranged in an image capturing date order, a large face area for displaying an image in which a face region of a specified object has a ratio larger than a predetermined ratio relative to a whole image, a small face area for displaying an image in which a face region of the object has a ratio smaller than a predetermined ratio relative to the whole image, and a people area for displaying an image in which a plurality of persons including the object are photographed as objects.

4. The non-transitory computer-readable recording medium having stored therein the album producing program according to claim 1, wherein the generating includes generating the album by excluding an event page not including the event images from among event pages produced for the album production target duration, and a usual page not including the usual-day images from among usual pages produced for the album production target duration.

5. An album producing method comprising:
classifying, using a processor, captured images into event images captured in event duration and usual-day images captured on a usual day in routine event duration excepted from the event duration, the event duration and the routine event duration being included in a predetermined duration;
producing, for an individual album production target duration, an event page in which event images captured in the album production target duration are inserted and a usual page in which usual-day images captured in the album production target duration are inserted, using the processor; and
generating an album using the event page and the usual page produced for the album production target duration, using the processor.

6. An album producing device comprising:
a memory which stores therein an event in association with event duration indicating duration of the event; and
a processor that is connected to the memory, wherein the processor executes a process including:
classifying captured images into event images captured in the event duration and usual-day images captured on a usual day in routine event duration excepted from the event duration, the event duration and the routine event duration being included in a predetermined duration;
producing, for an individual album production target duration, an event page in which event images captured in the album production target duration are inserted and a usual page in which usual-day images captured in the album production target duration are inserted; and
generating an album using the event page and the usual page produced for the album production target duration.

* * * * *